United States Patent [19]
Hedberg et al.

[11] Patent Number: 5,331,849
[45] Date of Patent: Jul. 26, 1994

[54] AERODYNAMICALLY SHAPED PROBE

[75] Inventors: Eric A. Hedberg, St. Paul; Jeffrey M. Setterholm, Lakeville, both of Minn.

[73] Assignee: Rosemount Inc., Eden Prairie, Minn.

[21] Appl. No.: 916,498

[22] Filed: Jul. 20, 1992

[51] Int. Cl.⁵ .................... G01C 21/00; G01F 1/46
[52] U.S. Cl. ........................................ 73/182; 73/180; 73/861.65
[58] Field of Search .............. 73/182, 180, 861.65, 73/861.66, 861.67, 861.68

[56] References Cited

U.S. PATENT DOCUMENTS

| | | | |
|---|---|---|---|
| 2,204,367 | 6/1940 | Kollsman | 73/212 |
| 3,030,807 | 4/1962 | Scadron | 73/212 |
| 3,163,040 | 12/1964 | Werner | 73/212 |
| 3,318,146 | 5/1967 | De Leo et al. | 73/180 |
| 3,482,445 | 12/1969 | De Leo et al. | 73/182 |
| 4,096,744 | 6/1978 | De Leo et al. | 73/180 |
| 4,275,603 | 6/1981 | Kalocsay | 73/182 |
| 4,378,696 | 4/1983 | De Leo et al. | 73/182 |
| 4,378,697 | 4/1983 | De Leo et al. | 73/182 |
| 4,615,213 | 10/1986 | Hagen | 73/180 |
| 4,645,517 | 2/1987 | Hagen et al. | 55/182 |
| 4,718,273 | 1/1988 | McCormack | 73/180 |
| 4,836,019 | 6/1989 | Hagen et al. | 73/180 |
| 5,025,661 | 6/1991 | McCormack | 73/180 |

FOREIGN PATENT DOCUMENTS

WO92/16849 10/1992 PCT Int'l Appl. .
857427 12/1960 United Kingdom .
WO86/07465 12/1986 World Int. Prop. O. .

Primary Examiner—Donald O. Woodiel
Attorney, Agent, or Firm—Westman, Champlin & Kelly

[57] ABSTRACT

The present invention relates to a air data sensing probe that has a cylindrical barrel joined to a contoured strut section. The strut has leading and trailing edges formed along curved paths, and supports the cylindrical barrel at a position spaced from a mounting surface and facing upstream of relative air movement. The strut has a rounded leading edge, and is generally ogival-shaped in cross-section. There is a blended, relatively quickly-changing transition section to blend the trailing end of the cylindrical barrel into the ogival-shaped strut section so that the probe has reduced weight of the strut and drag, and through reduction of the cross-sectional area and rounding the strut leading edge, has enhanced anti-icing performance.

13 Claims, 4 Drawing Sheets

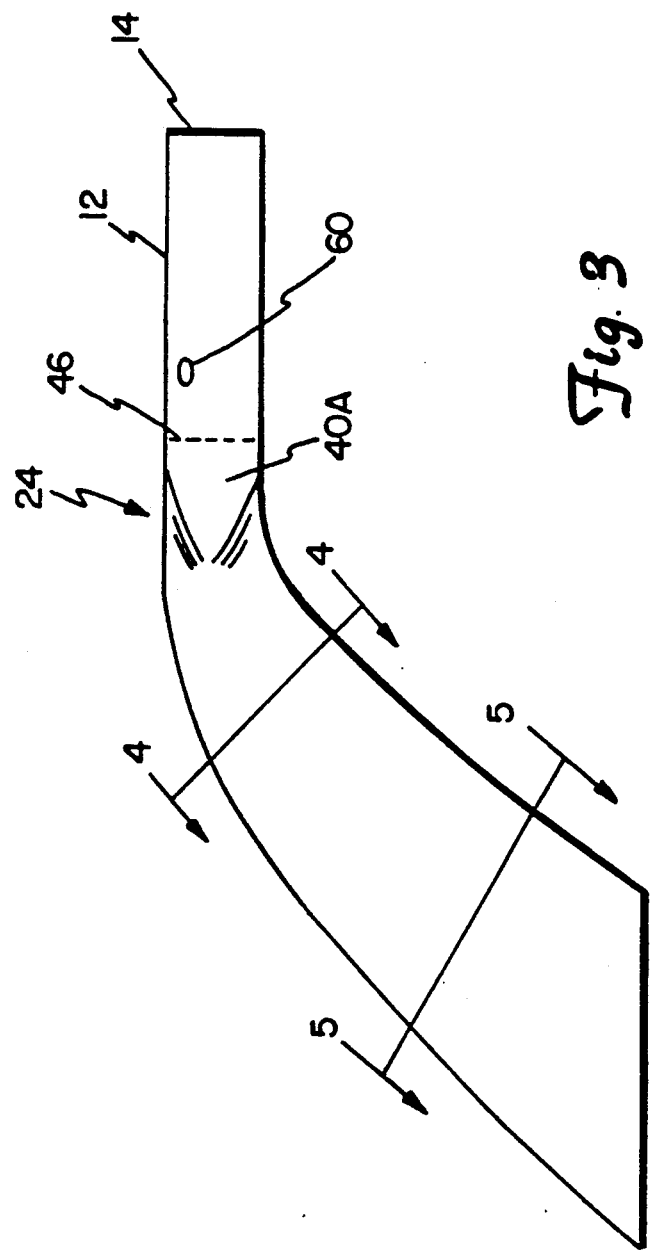

AERODYNAMICALLY SHAPED PROBE

BACKGROUND OF THE INVENTION

The present invention relates to an air data sensing probe that is small in size to reduce weight while enhancing aerodynamic performance.

Strut-mounted probes for air data sensors have been utilized for years. There have also been probes which include curved tubes that have a forward-facing port for sensing pitot pressure, and curve laterally to the side and rearwardly to a mounting base or plate for mounting onto the side of a fuselage of an air vehicle. Such probes or air data sensing devices protrude from a surface of an air vehicle, and thus will undesirably increase drag when compared with a similar vehicle without such protrusion. Since strut-mounted probes are adjacent to the air vehicle surface, pressure disturbances caused by the strut and adjacent surface need to be compensated in various ways. Strut-mounted probes also have to be heated for de-icing during use. The mass of the air data sensing device should also be minimized.

Cylindrical barrel probes have been utilized for sensing pitot and/or static pressure. Pitot pressure is sensed through a forwardly facing port, while static pressure is sensed through an opening generally perpendicular to the air flow. The strut on which the barrel is mounted generally has a streamlined cross-section in fore and aft direction. Suitable strut thickness has to be provided for de-icing heaters and also for carrying the pressure signal conduits or tubes.

It also has been known in the prior art to provide front and rear edges of air data sensor struts that are shaped in compound curves to transition from a forwardly-facing port to a side-mounting base for the air data sensor.

SUMMARY OF THE INVENTION

The present invention relates to an air data sensor probe which can be for sensing pitot and/or static pressure that utilizes a cylindrical, forward-facing barrel having an open end for sensing pitot pressure. The barrel is supported by a strut that curves rearwardly from the barrel and also laterally to attach to a mounting base for mounting the air data sensor onto a supporting surface. The strut has diverging front and rear edges that curve toward the mounting base from the barrel. The strut is generally an ogival shape, with a relatively rounded front edge which aids in shedding ice, and thus reduces the amount of heat required during de-icing operation.

The barrel mounts to the strut with a support section that blends rapidly from cylindrical to the ogival shape, using smooth surface contours to minimize drag. The air data sensing probe is small or compact and of low weight when compared to other sensors in use, as well as being low in drag.

BRIEF DESCRIPTION OF THE DRAWINGS

FIG. 3 is a schematic representation of a top plan view of the device of FIG. 1;

DETAILED DESCRIPTION OF THE PREFERRED EMBODIMENTS

Figure 1:
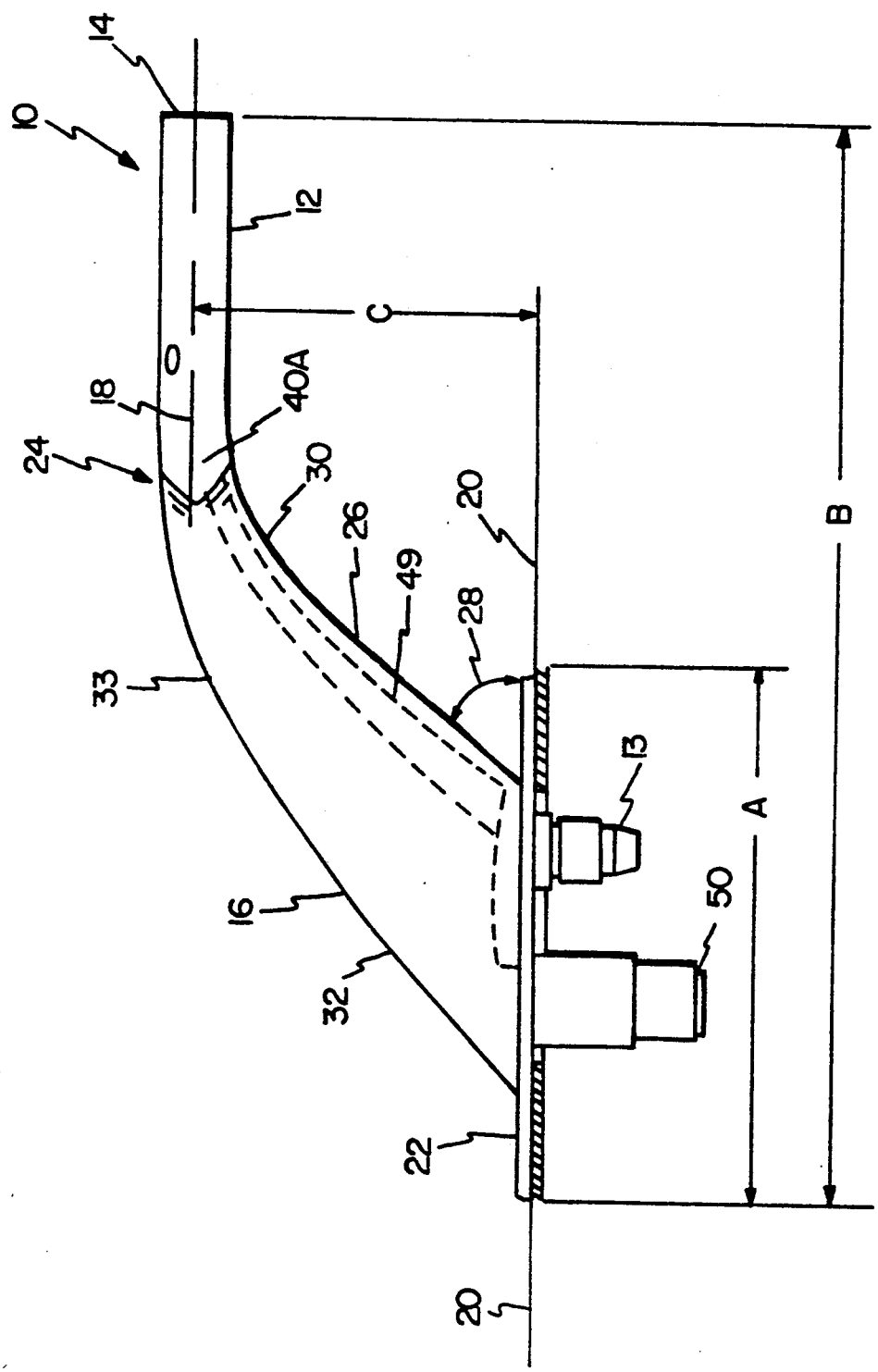
FIG. 1 is a top plan view of a strut mounted air data sensor probe according to the present invention.

As shown in FIG. 1, an air data sensing probe indicated generally at 10 in FIG. 1 includes a cylindrical barrel portion 12 that has an end opening 14 facing toward the direction of air flow. The cylindrical barrel 12 is mounted onto a strut section 16, which in turn curves laterally and rearwardly from the trailing end of cylindrical barrel 12, and laterally from a central axis 18 of the cylindrical barrel 12 toward a surface or skin 20 of an air vehicle. The strut 16 has a mounting or plate base 22 that mounts to the air vehicle in a conventional manner. Generally, the outer side of the plate 22 is flush with the skin 20 so that drag is minimized.

Figure 2:
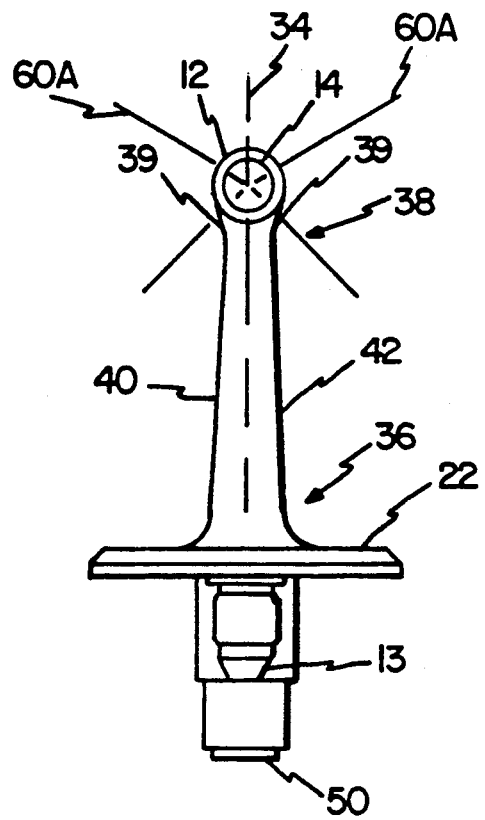
FIG. 2 is a front elevational view of the device of FIG. 1.
Figures 4, 5:
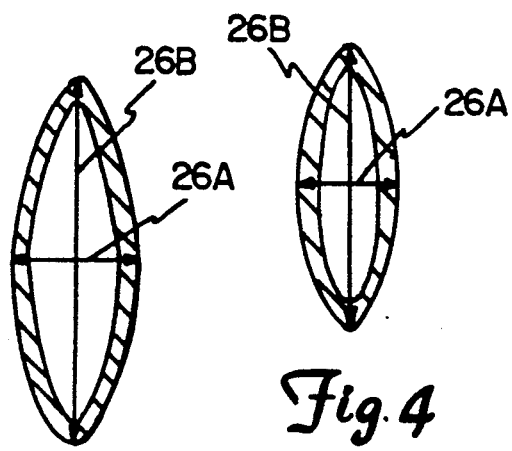
FIG. 4 is a sectional view taken as on line 4—4 in FIG. 3.
FIG. 5 is a sectional view taken as on line 5—5 in FIG. 3.

As shown in FIG. 2, the cylindrical leading end opening 14 is across the entire internal diameter of the barrel 12. The opening 14 forms a pitot pressure sensing port facing in upstream direction to the air flow and is connected to suitable tubing, not shown, within strut 16. The tubing has an end connector 13, which is joined to a suitable pressure sensor, not shown. The cylindrical barrel 12 is transitioned to a generally ogival cross-section shape of the strut 16 (as can be seen in FIGS. 4 and 5) in a short transition section 24 that smoothly blends the cylindrical shape of barrel 12 to the ogival cross-section of strut 16 in a minimum distance and without having sharp or irregular edges. The cylindrical barrel 12 maintains a true cylindrical shape for a substantial length along its longitudinal axis 18, which length is substantially equal to the distance between the plane of side surface 20 of the air vehicle and the barrel 12. The effect of the strut on air pressure in opening or port 14 is thus reduced to enhance reliability of the pressure signals.

The strut 16 itself has compound curved front and rear (leading and trailing) edges. A rounded (not sharp) leading edge 26 extends substantially in a straight line adjacent the air vehicle at a forwardly inclined angle indicated at 28 relative to the air vehicle surface 20. The leading edge 26 then curves at section 30 to tangentially join the outer surface of the cylindrical barrel 12. The rear or trailing edge indicated at 32 extends at a gentle but different curve from the point where it joins the base 22 than the leading edge 26 forwardly and outwardly from the aircraft skin 20 and base 22. The edges 32 and 26 converge in direction toward the rear end of barrel 12, or, in other words, diverge in direction away from the barrel 12 back toward the base 22. A gentle, relatively large radius section 33 of the trailing edge 32 blends into the outer surface of the cylindrical barrel 12.

Figure 6:
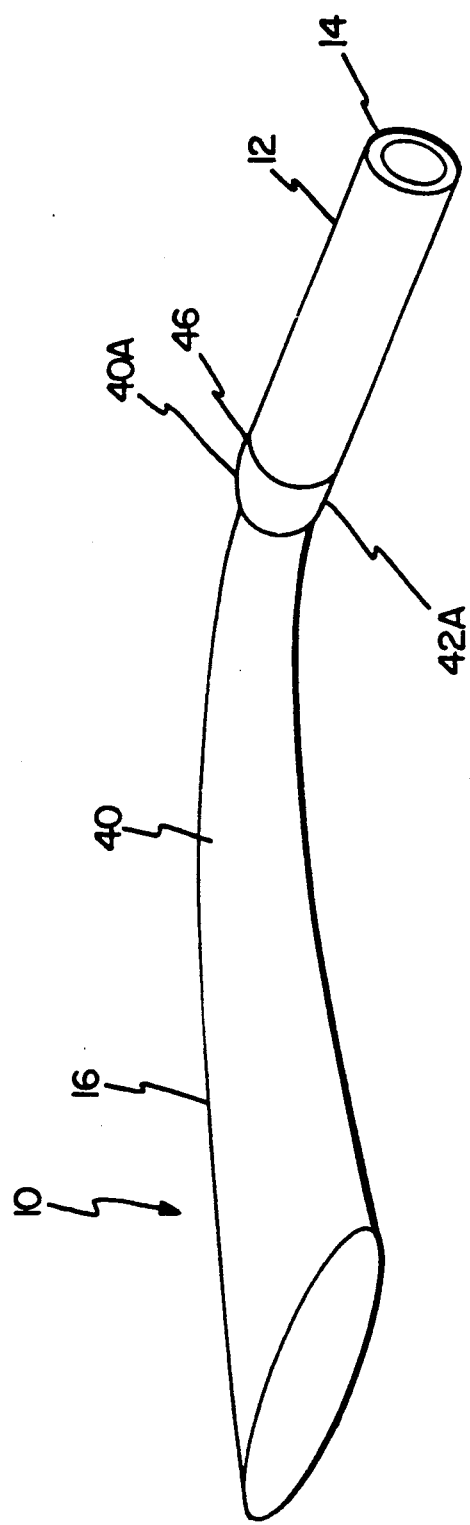
FIG. 6 is a perspective view of the strut-mounted air data sensor probe made according to the present invention.

As shown in FIG. 2, the strut 16 also tapers in thickness along a central axis 35, which is shown generally in dotted lines at 34, so that the strut 16 is relatively thick or wide at its base portion 36 and reduces in size to a lateral dimension at 38 that is less than the diameter of the cylindrical barrel 12. Smoothly varying compound curved surfaces 39 are used for joining the strut 16 and the cylindrical barrel 12. Referring to FIGS. 2, 3 and 6, the surfaces are smoothly tapered to avoid irregularities that will increase drag or cause substantial air turbulence. On the upper surface of the strut 16, which is indicated at 40, the transition section 24 has a blending surface 40A. The blending surface 40A smoothly enlarges in multiple directions from the surface 40, and enlarges to become cylindrical at about the line 46. This blending surface also is designed to minimize drag while providing adequate support for the cylindrical forwardly-directed barrel 12. A bottom surface 42 has a similar enlarged surface blending to the cylindrical barrel section 12, as shown in 42A in FIG. 6.

The sensor probe 10 has heaters shown schematically at 49 installed in the strut 16 and also may have heaters in the barrel 12 for de-icing. The heaters can be resistance heaters of conventional design. A suitable connector is shown at 50 in FIG. 1 for electrical connections to the heaters from the interior of the air vehicle. The leading edge 26 of the strut 16 provides a rounded surface that tends to shed ice. The rounded leading edge 26 also provides an area for insertion of a resistance heater along and close to the edge 26 to increase the temperature sufficiently to melt or remove the ice.

The ogival cross-section strut 16 is thin throughout its length to reduce drag, and the quick transition section 24 from the cylindrical or circular cross-section barrel 12 to a thin ogival strut section 16 is a smooth contoured surface as well that tends to reduce weight, and decrease drag. The transition section 24 extends in direction of axis 18 preferably in the range of one diameter of the barrel 12. The transition sections should be kept below two barrel diameters in axial direction.

The chord length to thickness ratio, that is, the lateral dimension of the ogival cross-section indicated at 26A in FIGS. 4 and 5 relative to the chord measured from the leading to the trailing edges of the ogival strut and indicated at 26B, for example, provides a strut that reduces drag substantially, and also minimizes the weight while providing adequate strength.

The ratio between the transverse dimension 26A and the chordal dimension 26B may change substantially throughout the length of the strut 16. In other words, although the strut 16 is thinner where the chord length is shorter when measured normal to the central axis of the strut 16 the ratio changes. Although the transition surfaces 40A and 42A introduce a dislocation in the flow, the blending area 24 reduces this dislocation. The surfaces of strut 16 are convex on the exterior sides 40 and 42, as shown, and the walls of strut 16 are kept relatively thin. The reduced cross-sectional area of the strut 16 also enhances the anti-icing performance. As previously stated, the effect of strut-induced pressure errors on the measured pitot pressure opening 14 are also reduced. The cylindrical section of the barrel 12 provides for a large size pitot opening 14 relative to the diameter of the tube used.

Referring to FIG. 3, a static pressure sensing port 60 can be provided on the cylindrical barrel 12 at a desired location both as to annular position around the barrel 12 and also longitudinal or axial position along the barrel 12. Usually, the axis of the static sensing port is to the outer side of the probe and there can be two ports, one facing upwardly at about 60° from horizontal and the other downwardly also 60° from horizontal. These axes are shown at 60A in FIG. 2. In such case, suitable plumbing or tubing, not shown, is provided from the port 60 for carrying the static pressure signals back through the strut 16 to the air vehicle.

The probe in one form, is very compact and light. Typically, for an example of proportions, the overall length of the base (A) as shown in FIG. 1 may be from 3.5 to 4.5 inches; the length from the trailing out of the base to the tip of the barrel, (B) is 6.25 to 7.5 inches (less than 7.5 inches is preferred); the offset, (C) is 2.25 to 2.5 (less than 2.5 inches is preferred); and the barrel outside diameter is typically 0.44 inches, to about 0.5 inches. In FIG. 6, the barrel is shorter and the probe is about 6.5 inches in overall length.

The same general proportions can be used in larger pilot-static tubes. For example, where the overall length, (B) may range up to 14 to 18 inches with and the barrel length up to about 6 inches and the diameter about 0.75 to 0.9 inches.

Although the present invention has been described with reference to preferred embodiments, workers skilled in the art will recognize that changes may be made in form and detail without departing from the spirit and scope of the invention.

What is claimed is:

1. A pressure-sensing probe for mounting on an air vehicle comprising:

a barrel having a generally cylindrical shape, a central axis centered on a diameter of an outer surface of the barrel, and a length along the central axis and a pressure sensing port;

a mounting base;

a strut extending between said mounting base and the barrel comprising curved leading and trailing edges that define a bisecting plane and that converge in direction away from the mounting base toward the barrel, the strut having a generally ogival cross-sectional shape, the strut extending to a position adjacent an end of the barrel the dimension of the strut perpendicular to the plane being less than the diameter of the barrel at the outer end of the strut; and a transition surface section interposed between the strut and the barrel that is smoothly contoured to blend from the ogival cross-sectional shape of the strut to the cylindrical shape of the barrel.

2. The pressure sensing probe of claim 1 wherein the transition surface section has an axial dimension in direction along the central axis of the barrel that is not substantially greater than the diameter of the outer surface of the barrel.

3. The pressure sensing probe specified in claim 1 wherein the leading edge of the strut is rounded in cross-section when compared to the trailing edge of the strut, which forms a sharp edge in cross-section.

4. The pressure sensing probe as specified in claim 1 wherein the barrel has a pitot pressure sensing opening at a leading end of the barrel and facing upstream relative to an air flow, the opening having a diameter substantially equal to an inner diameter of the barrel.

5. The pressure sensing probe of claim 1 wherein the pressure sensing port comprises an opening in a leading end of the barrel relative to movement of fluid past the barrel.

6. The pressure sensing probe of claim 5 and a separate static pressure sensing port on the barrel spaced from the leading end.

7. The pressure sensing probe of claim 5 wherein the barrel comprises a tube having an interior bore extending along the central axis and the bore opening to the leading end to form the pressure sensing port.

8. The pressure sensing probe of claim 1 wherein the barrel comprises a straight tube having a substantially uniform outer surface diameter throughout its length and having a substantially uniform diameter bore extending from a leading end of the barrel to a position adjacent to the strut, the leading end of the bore forming the pressure sensing port.

9. The pressure sensing probe of claim 1 and heater means on the probe for eliminating ice accumulation.

10. The pressure sensing probe of claim 1 wherein the transition section has an axial length of less than 2 times the diameter of the barrel.

11. A pressure sensing probe for mounting on an air vehicle comprising:

a cylindrical barrel having a generally circular cross section, a central axis centered on a diameter of an outer surface of the barrel, and a length along the central axis, and having a pressure sensing port thereon;

a mounting base;

a strut extending between said mounting base and the barrel comprising curved leading and trailing edges that define a plane and that extend outwardly from the base and curve in a forward direction at location spaced from the base such that the edges merge with the outer surface of the barrel and are generally parallel to the central axis where they merge with the barrel, the edges also converging from the base toward the barrel, the edges being spaced apart substantially at the base and said edges spaced apart in said plane a distance substantially equal to the barrel diameter where they merge with the barrel, the converging edges extending to space the barrel from the mounting base, the strut having a generally ogival cross sectional shape with a maximum dimension measured perpendicular to the plane less than the diameter of the barrel in the region adjacent the barrel; and a short transition section interposed between the strut and the barrel from the ogival cross sectional shape to the cylindrical shape barrel in a distance along the central axis less than two times the diameter of the barrel, with the transition section having surface curving smoothly at all regions of the junction between the strut and the barrel.

12. The pressure-sensing probe of claim 11 wherein the barrel has an outside diameter of less than 0.5 inches.

13. The pressure-sensing probe of claim 12 central axis is spaced from a mounting surface supporting the base less than 2.5 inches.

* * * * *